United States Patent [19]

Ammeraal

[11] Patent Number: 4,738,923

[45] Date of Patent: Apr. 19, 1988

[54] PROCESS FOR PRODUCING AND SEPARATING CYCLODEXTRINS

[75] Inventor: Robert N. Ammeraal, Worth, Ill.

[73] Assignee: American Maize-Products Company, Stamford, Conn.

[21] Appl. No.: 865,059

[22] Filed: May 20, 1986

[51] Int. Cl.$^4$ .................... C12P 19/18; C08B 37/16
[52] U.S. Cl. ....................................... 435/97; 536/103
[58] Field of Search .......................... 435/97; 536/103

[56] References Cited

U.S. PATENT DOCUMENTS 4,477,568 10/1984 Hokse et al. ..................... 435/97

Primary Examiner—Lionel M. Shapiro
Attorney, Agent, or Firm—Lucas & Just

[57] ABSTRACT

The present invention is directed to the process of producing and separating cyclodextrins and in particular to the process of using food grade hydrocarbons that include a six membered ring having some unsaturation and ten carbon atoms such as limonene and the like natural oils.

16 Claims, No Drawings

PROCESS FOR PRODUCING AND SEPARATING CYCLODEXTRINS

The present invention is directed to the process of producing and separating cyclodextrins and in particular to the process of using food grade hydrocarbons that include a six membered ring having some unsaturation and ten carbon atoms such as limonene and the like natural oils, abundant in plants and known as monoterpenes.

Cyclodextrins, also called "Schardinger dextrins", are known to be cyclic oligosaccharides composed of 6, 7 or 8 glucose residues bonded together by alpha 1,4 bonds. The 6 membered ring is referred to as alpha-cyclodextrin, the 7 membered ring is beta-cyclodextrin and gamma-cyclodextrin is the 8 membered ring.

Cyclodextrins are non-reducing dextrins and the ring structure is widely used as a host for the inclusion of various compounds, usually organic compounds for the food, pharmaceutical and chemical fields.

As is also well-known, cyclodextrins are produced from starch of any selected variety such as corn, potato, waxy corn and the like which may be modified or unmodified starch derived from cereal or tuber origin and the amylose or amylopectin fractions thereof. The selected starch in aqueous slurry at a selected concentration up to about 35% by weight solids is usually liquefied as by gelatinization or treatment with a liquefying enzyme such as bacterial alpha-amylase enzyme and then subjected to treatment with a cyclodextrin transglycosylase (CGT) enzyme such as B. macerans amylase, B. circulans, B. stearothermophilus, B. megaterium, B. ohbensis, B. klebsiella pneumoniae and B. micrococcus and the like in conventional manner.

The amount of alpha, beta and gamma cyclodextrins produced by treatment of starch with CGT will vary depending on the selected starch, CGT enzyme and processing conditions. Conventionally, the DE of the liquefied starch is maintained below about 20 DE, the starch solids concentration is below about 50%, the pH for conversion may be about 4.5 to 8.5 at a selected temperature from about ambient and up to about 75° C. for a selected period of time typically from about ten hours up to seven and more days. The amount of CGT used for conversion will depend on the reaction time and the enzyme activity. Enzyme units may be defined in a variety of arbitrary ways. Two to four Tilden-Hudson units per gram of starch is typical (U.S. Pat. No. 3,425,910—Armbruster and Kooi).

The production of alpha, beta and gamma cyclodextrins by CGT enzyme conversion has been known to those of skill in the art since at least as early as 1949 and the parameters to select for treatment with CGT for the desired result in the amount of each individual alpha, beta and gamma cyclodextrins to be produced is conventional and well described in the literature.

Precipitation and separation of cyclodextrins described in the prior art include solvent systems (D. French et al. J. Am. Chem. Soc. 71, 353 (1949)), inclusion compounds for precipitating selected cyclodextrins from the CGT reaction liquor such as trichloroethylene, tetrachloroethane, bromobenzene and the like (U.S. Pat. No. 3,425,910) as well as non-solvent systems utilizing selected ion exchange resins and chromatographic gel filtration (U.S. Pat. Nos. 4,418,144 and 4,303,787). But none of these have been entirely satisfactory because of the toxic nature of the inclusion compounds and the large volume of liquids that must be handled in the non-solvent and ion exchange separation systems.

It has now been discovered that food grade non-toxic hydrocarbons having a six membered unsaturated ring and ten carbon atoms may be used to great advantage in the production and separation of beta and gamma cyclodextrins. The specified food grade hydrocarbon is preferably of natural origin such as limonene ($C_{10}H_{16}$) that occurs in various ethereal oils particularly in oils of lemon, orange, caraway, dill and bergamot. Of these, d-limonene from mandarin peel oil (citrus reticulata blanco rutaceae) has been shown to be particularly effective in accordance with the present invention.

For convenience of description, the specified unsaturated ring compound shall be referred to but not limited to limonene which is a conventional product readily available in the market. The selected limonene oil is added to the starch conversion slurry along with or before or after the CGT enzyme. In this embodiment of the invention, the limonene oil resulted in driving the reaction into producing beta-cyclodextrin to provide a yield of 39.3% crude beta-cyclodextrin:limonene complex from which the beta-cyclodextrin of very high purity was recovered. In a second embodiment of the invention, a conventional mixture of oligosaccharides obtained from a non-solvent CGT digest and containing alpha, beta and gamma-cyclodextrins was used as the starting material. In this embodiment, the limonene oil was employed in a first step to precipitate the cyclodextrins from the digest and in a second step to remove the beta-cyclodextrin and then in a third step all of the remaining cyclodextrins were precipitated from solution which upon refining and crystallization resulted in an excellent yield of gamma-cyclodextrin of very high purity.

These and other advantages of the present invention will be appreciated from the detailed description of preferred embodiments herein chosen for the purpose of illustration in connection with the following flow diagram examples:

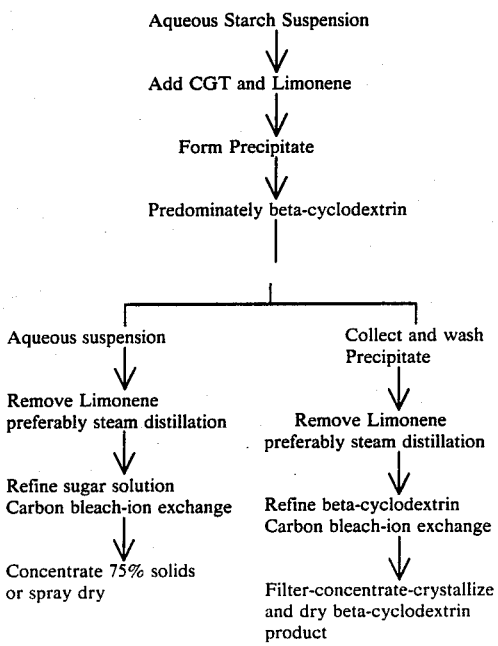

In this example, CGT (macerans) enzyme in the amount of about 2 Tilden-Hudson units per gram of starch hydrolysate was added to a 35% by weight aqueous suspension of 7 DE waxy maize starch hydrolysate followed by the addition of 8% by weight of limonene based on the weight of starch hydrolysate. The limonene was a regular commercial grade sold under the brand name of Kodak D-Limonene Technical by Eastman Kodak Company.

The slurry at ambient temperature was stirred for 10 hours and thereupon the precipitate that formed was collected and washed with water. A 7% by weight slurry of the washed precipitate was boiled to remove all of the limonene oil from the slurry and from the precipitate as determined by visual observation. Thereafter the aqueous suspension was refined by carbon bleaching in conventional manner using about 3% by weight of carbon based on solids at 75° C. The suspension was then passed through an ion exchange column in conventional manner to remove salts and the remaining carbon was removed by filtration.

The solution was concentrated to about 15% solids and allowed to stand at room temperature to crystallize the cyclodextrin which was collected and washed with water until there was less than 2% solids in the wash water. The resulting product was dried to less than about 12% moisture content. Upon analysis the product was a 99.5% pure beta-cyclodextrin. A yield of 39.3% by weight of crude limonene complex was recovered and a yield of 24% pure beta-cyclodextrin was achieved based on the weight of starch hydrolysate in the enzyme conversion slurry.

It will be understood that any conventional procedure may be employed to form the beta-cyclodextrin in the presence of the limonene which causes the predominate formation of beta-cyclodextrin. The small amount of alpha and gamma-cyclodextrins that formed was washed away from the betacyclodextrin. The amount of limonene used for controlling the conversion and precipitating cyclodextrins may be varied and in general an amount sufficient to precipitate the cyclodextrins without forming a visible layer of oil on the surface is adequate. A large excess may be used but this may create a disposal problem when used in large scale production.

Removal of the limonene oil from the precipitate and aqueous suspension may be carried out in any convenient manner as by boiling, organic solvent washing, steam injection, etc. However, best results are achieved with jet cooking which materially reduces the handling of liquid and recovery of the pure cyclodextrin. The jet cooking is preferably carried out at about 320° F. with the aqueous suspension at a neutral pH since an acid pH may result in a tendency to brown the product.

In certain applications it may be desirable to use the limonene of the present invention in combination with the prior art organic solvent, inclusion compounds or ion-exchange resin systems currently used for the separation and recovery of any one or more of alpha, beta or gamma cyclodextrins. It would be well within the skill of the art to separate and recover a selected one of the cyclodextrins using the limonene of the present invention and the other two cyclodextrins by prior art procedures.

Refining of the cyclodextrins by conventional carbon bleaching and ion exchange resin treatment to remove salts is desirable for use in foods and pharmaceutical compositions. Best results in removing the salts are obtained by treatment with a cation as well as an anion exchange resin which may be packed in a single column or used separately in conventional manner.

In this example, the starting material was the beta-cyclodextrin mother liquor of a non-solvent digest, similar to a product commercially available, that had a DE of 15 and contained about 2% by weight alpha-cyclodextrin, 6% by weight beta- cyclodextrin, 9% by weight gamma-cyclodextrin, about 70% by weight oligosaccharides and a minor, about 10% by weight of glucose and maltose. The mother liquor was dark brown in color and contained some insoluble suspended foreign material. The following flow diagram illustrates the process of this example:

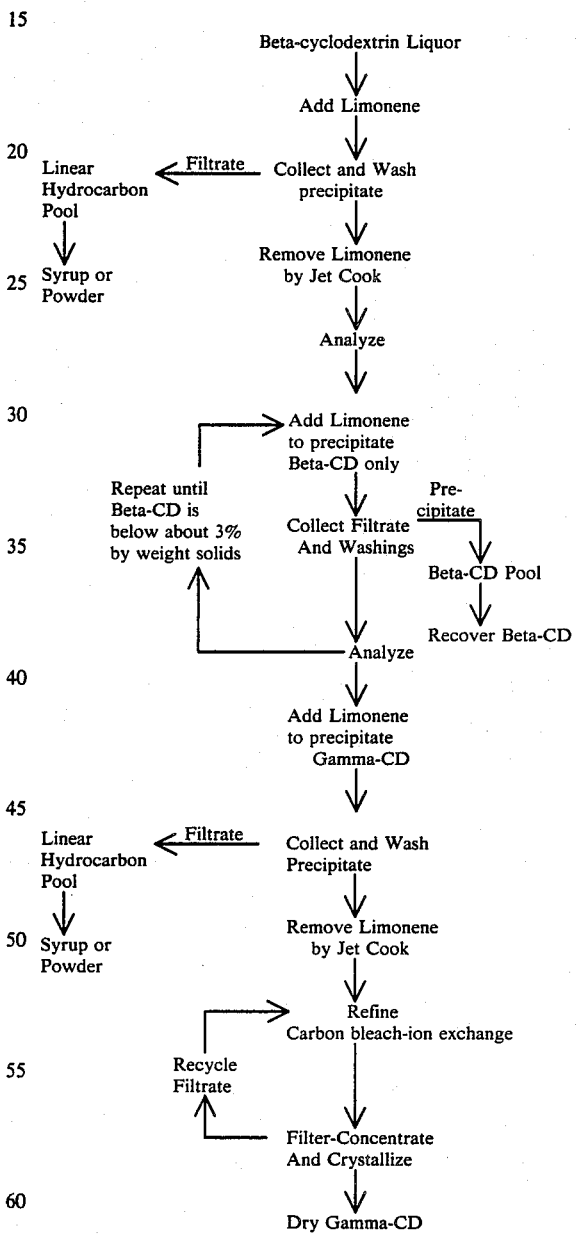

In this example, the mother liquor was used to form an aqueous suspension containing 30% by weight of solids. Limonene rich orange oil was added in the amount of 8% based on the weight of dry solids in the aqueous suspension. After mixing, the suspension was allowed to stand at ambient temperature for three days.

The limonene complexed precipitate was collected, removed and washed with water. To enrich the gamma-cyclodextrin in the aqueous suspension, beta-cyclodextrin was removed by precipitation with stoichiometric (in regard to beta-cyclodextrin) amounts of limonene. This procedure of enriching the gamma-cyclodextrin content of the aqueous suspension was repeated until the beta-cyclodextrin content was reduced below about 3% by weight. In this example, it required 4 cycles of limonene additions to reduce the beta-cyclodextrin content in the aqueous suspension to below about 3% by weight. The standing time at ambient temperature after mixing in the limonene was reduced to about two hours during these cycles. In all cases, high performance liquid chromatography analysis was used in conventional manner to determine sugar and cyclodextrin content of solutions.

The gamma-cyclodextrin in the suspension along with any other remaining cyclodextrins was precipitated by adding and mixing into the liquor 22% limonene by weight based on the original weight of dry solids. The mixture was allowed to stand 20 hours whereupon the precipitate was filtered out and washed with water. The precipitate was then slurried in water at a 10% solids level and jet cooked in conventional manner to remove the limonene. The slurry after jet cooking was concentrated to 20% solids by weight and bleached with 3% by weight powdered carbon and passed through an ion-exchange column to remove salt in conventional manner. Thereafter the solution was filtered to remove haze and then concentrated to 47% by weight solids and the gamma-cyclodextrin was allowed to crystallize by standing at ambient temperature. The crystals were collected by filtration, washed with water and dried to less than 12% moisture content. The yield of gamma-cyclodextrin was 2.9% by weight of the solids in the starting beta cyclodextrin mother liquor and the purity was 98.8%. Moreover, the gamma-cyclodextrin recovered in accordance with the present invention was a white powder notwithstanding the fact that the beta-cyclodextrin mother liquor was dark brown in color and it contained insoluble foreign materials.

In this example, the slurry containing the beta-cyclodextrin mother liquor was discarded after extracting the gamma-cyclodextrins because of color but if desired the limonene may be removed by jet cooking and the sugar solution refined and spray dried as in the first example.

The crystallization of the gamma-cyclodextrin is preferably carried out at room temperature by concentrating the aqueous liquor to about 47% solids by weight and the filtration and crystallization steps are preferably repeated for maximum yield. If desired, crystallization may be carried out by reducing the temperature of the liquor to about 4° C. and in such case the liquor need not be concentrated down to about 47% solids.

Best results have been achieved in accordance with the present invention with slurries containing about 10 to 35% by weight of solids and up to about 20% limonene by weight based on the weight of starch hydrolysate in the CGT conversion slurry. The amount of limonene employed for extraction of cyclodextrins may be up to 50% by weight of the cyclodextrins present in the liquor but will not usually exceed 35% by weight. While in the examples cyclodextrin precipitation was carried out at ambient temperature, this is not necessary and the precipitation may be carried out at the elevated temperatures since the limonene will precipitate insoluble cyclodextrins at 75° C. The pH of the conversion and separation liquors are those conventionally employed in the art and are not particularly important except in the case of jet cooking where a pH of 7.0 and above is desirable to prevent the formation of color.

The mechanism of the limonene in the separation and recovery of individual cyclodextrins by differential precipitation is a complex phenomenon not completely understood and it apparently does not follow the difference in solubility of cyclodextrins. About 1.8 grams of beta-cyclodextrin, about 14 grams of alpha-cyclodextrin and about 23 grams of gamma-cyclodextrin will dissolve in 100 ml of water. The limonene exhibited a first preference for precipitating the beta-cyclodextrin but it exhibited a second preference for precipitating gamma-cyclodextrin in an aqueous mixture containing all three of the cyclodextrins.

The limonene of the present invention increases the overall yield of beta-cyclodextrin when it is present during the conversion with CGT as in the first example above and as there described it drives the reaction toward producing the beta-cyclodextrin in preference to the alpha and gamma-cyclodextrins. Corn starch hydrolysates may be employed in the CGT conversion in accordance with the present invention as compared to the prior art processes in which potato starch is usually employed. Discarded off color liquors from prior art processes containing insoluble foreign material mixed in with the cyclodextrins may be used as the starting material to advantage in the present invention and there is no need to employ the extremely large volumes of organic solvents or toxic inclusion compounds of the prior art separation systems.

It will be understood that it is intended to cover all modifications and changes in the preferred embodiments of the present invention herein chosen for the purpose of illustration which do not constitute a departure from the spirit and scope of the invention.

What is claimed is:

1. A process for the production of cyclodextrins which comprises the step of converting a gelatinized starch to cyclodextrin with a transglycosylase enzyme in the presence of limonene.

2. A process for extracting cyclodextrins from an aqueous suspension which comprises the steps of adding limonene to the aqueous suspension in an amount up to about 50% by weight of the cyclodextrin therein, mixing the limonene with the cyclodextrin in the aqueous suspension to precipitate cyclodextrin complexed with said limonene, collecting the precipitate that forms in said aqueous suspension and separating the limonene from said precipitate to recover the cyclodextrin.

3. A process for producing cyclodextrin which comprises the steps of:
   (a) forming an aqueous suspension of a starch hydrolysate containing up to about 35% by weight of starch hydrolysate;
   (b) adding to said aqueous suspension a transglycosylase enzyme and limonene;
   (c) mixing the transglycosylase enzyme and limonene with said starch hydrolysate to form a precipitate of cyclodextrin complexed with said limonene; and
   (d) collecting the precipitate so formed and separating the limonene from the precipitate to recover the cyclodextrin.

4. The process of claim 3 in which the DE of the starch hydrolysate aqueous suspension is not over about 20.

5. The process of claim 4 in which the limonene is added in an amount of up to about 20% by weight of the starch hydrolysate dry solids.

6. The process of claim 5 in which the precipitate is formed at ambient temperature.

7. The process of claim 6 in which the collected precipitate is slurried in water and the resulting aqueous slurry is jet cooked to separate the limonene from the cyclodextrin.

8. The process of claim 7 in which the cyclodextrin is crystallized in said aqueous slurry after removal of the limonene and the crystallized cyclodextrin is recovered from the aqueous slurry.

9. The process of claim 8 in which the cyclodextrin is beta-cyclodextrin having a purity of at least about 98%.

10. The process of claim 3 in which the aqueous suspension of starch hydrolysate after removal of the precipitate is jet cooked to remove the limonene and thereafter concentrated to sugar syrup containing up to 75% by weight of solids or spray dried to particulate solids.

11. The process of claim 4 in which the starch is a waxy maize starch hydrolysate having a DE not over about 10.

12. A process for extracting cyclodextrin from the solids of the precipitate of claim 2 which comprises the steps of:
(a) forming an aqueous suspension of said solids containing up to about 35% by weight of solids;
(b) adding and mixing limonene into said aqueous slurry in a first extraction step;
(c) forming a precipitate of cyclodextrin complexed with said limonene in said aqueous slurry;
(d) collecting said precipitate and removing it from said aqueous slurry;
(e) adding and mixing limonene into said aqueous slurry in a second extraction step;
(f) forming a second precipitate of cyclodextrin complexed with said limonene added in the second extraction step;
(g) collecting said second precipitate so formed and separating the limonene from the precipitate to recover the cyclodextrin.

13. The process of claim 12 in which the amount of limonene added in said first extraction is controlled to be not over the amount required to reduce the beta-cyclodextrin content in said aqueous suspension to below about 3% by weight.

14. The process of claim 13 in which the amount of limonene added in said second extraction step is sufficient to complex and precipitate substantially all of the cyclodextrins present in the aqueous suspension whereby beta-cyclodextrin and gamma-cyclodextrin are extracted and separated by the differential precipitation of said limonene for beta and gamma-cyclodextrins.

15. The process of claim 13 in which the beta-cyclodextrin content in said aqueous suspension is reduced to below about 3% by weight by a plurality of additions of limonene in said first extraction step.

16. The process of claim 2 in which the aqueous suspension includes glucose, maltose and oligosaccharides in addition to said cyclodextrin.

* * * * *

UNITED STATES PATENT AND TRADEMARK OFFICE
CERTIFICATE OF CORRECTION

PATENT NO. : 4,738,923

DATED : April 19, 1988

INVENTOR(S) : Robert N. Ammeraal

It is certified that error appears in the above-identified patent and that said Letters Patent are hereby corrected as shown below:

Column 3, line 10, after "for" insert --24--.

Signed and Sealed this

Twenty-fifth Day of October, 1988

Attest:

DONALD J. QUIGG

*Attesting Officer*  *Commissioner of Patents and Trademarks*